US009141848B2

(12) United States Patent
Gong et al.

(10) Patent No.: US 9,141,848 B2
(45) Date of Patent: Sep. 22, 2015

(54) AUTOMATIC MEDIA DISTRIBUTION

(75) Inventors: Michelle X. Gong, Sunnyvale, CA (US);
Wei Sun, San Jose, CA (US); Horst W. Haussecker, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 189 days.

(21) Appl. No.: 13/602,446

(22) Filed: Sep. 4, 2012

(65) Prior Publication Data
US 2014/0064576 A1 Mar. 6, 2014

(51) Int. Cl.
*G06K 9/00* (2006.01)
*G06K 9/32* (2006.01)

(52) U.S. Cl.
CPC .......... *G06K 9/00288* (2013.01); *G06K 9/3241* (2013.01)

(58) Field of Classification Search
CPC . G06K 9/46; G06K 9/00228; G06K 9/00221; G06K 9/00288; G06K 9/99281; G06K 9/00248
USPC ........................................................ 382/118
See application file for complete search history.

(56) References Cited

U.S. PATENT DOCUMENTS

| 7,177,450 | B2 * | 2/2007 | Tajima ........................... 382/118 |
| 7,643,685 | B2 * | 1/2010 | Miller ........................... 382/209 |
| 7,774,719 | B2 | 8/2010 | Taylor |
| 7,908,629 | B2 | 3/2011 | Lewis |
| 8,189,096 | B2 * | 5/2012 | Azar et al. ..................... 348/370 |
| 8,396,265 | B1 * | 3/2013 | Ross et al. ..................... 382/118 |
| 8,520,907 | B2 | 8/2013 | Lai |
| 8,712,189 | B2 * | 4/2014 | Bitouk et al. ................. 382/294 |
| 2004/0243671 | A9 | 12/2004 | Needham |
| 2010/0119123 | A1 * | 5/2010 | Mardell ........................ 382/118 |
| 2010/0158324 | A1 * | 6/2010 | Liu ............................... 382/118 |
| 2012/0086792 | A1 * | 4/2012 | Akbarzadeh et al. ........... 348/77 |
| 2014/0219517 | A1 * | 8/2014 | Mishra et al. ................. 382/118 |

OTHER PUBLICATIONS (Yeow Hong Ann, "Real-Time Face Tracking", 2005, Department of Computer Science School of Computing—National University of Singapore).*
(Scott Wilson, "Patterns of Personal Learning Environments", 2008, Educational Cybernetics: Journal Articles (Peer-Reviewed).*
(Xudong Xie, "An Efficient Illumination Normalization Method for Face Recognition", Elservier, Nov. 2005, http://www.sciencedirect.com).*
(Yongping Li, "Illumination Processing in Face Recognition", 2010, ://www.intechopen.com).*
PCT International Search Report and Written Opinion issued in corresponding PCT/US2013/056966 dated Dec. 30, 2013, (11 pages).

* cited by examiner

*Primary Examiner* — Samir Ahmed
*Assistant Examiner* — Totam Le
(74) *Attorney, Agent, or Firm* — Trop, Pruner & Hu, P.C.

(57) ABSTRACT

In accordance with some embodiments, wireless devices may automatically form ad hoc networks to enable more efficient sharing of media between the devices and in some cases more efficient facial recognition of captured media. In some embodiments, automatic story development may be implemented at the local level without involving backend servers.

25 Claims, 6 Drawing Sheets

AUTOMATIC MEDIA DISTRIBUTION

BACKGROUND

This relates generally to sharing media between wireless devices.

Wireless devices are capable of not only communicating using cellular communication systems but also receiving and recording a large amount of information using onboard sensors and Internet connections. For example most cellular telephones now have imaging devices, wireless networking capability using WiFi. Bluetooth and even Near Field Communications in some cases.

Thus, users who record images may wish to tag those images with user's names. Conventionally this is done in social networking sites by uploading photos so that the website runs facial recognition software to match each new photo to the photos that have already been tagged and stored on the server. Some users however may prefer not to involve servers in such activities and may want more elaborate and more automatic handling of media including pictures captured data from websites, audio files, clips and the like.

BRIEF DESCRIPTION OF THE DRAWINGS

Some embodiments are described with respect to the following figures.

DETAILED DESCRIPTION

In accordance with some embodiments, wireless devices may automatically form ad hoc networks to enable more efficient sharing of media between the devices and in some cases more efficient facial recognition of captured media. In some embodiments, automatic story development may be implemented.

Figure 1:
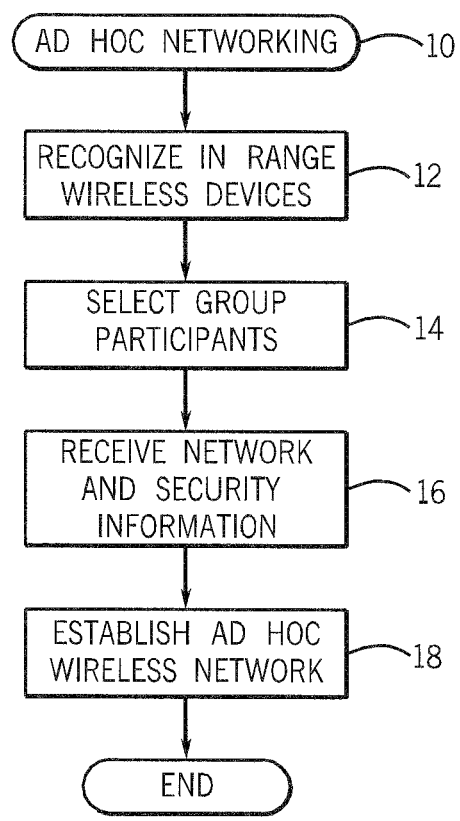
FIG. 1 is a flow chart for an ad hoc networking sequence in accordance with one embodiment.

Referring to FIG. 1, a sequence 10 may be used to automatically establish ad hoc networks. Initially as indicated in block 12, a given wireless device may recognize in-range wireless devices. Then group participants may be selected as indicated in block 14. In other words every in-range device is not automatically placed in the group but instead there is a first-time setup procedure for tapping the devices by bringing two phones close enough for Near Field Communications or receiving a QR code in order to join the ad hoc network. The recognition of nearby devices may be done using wireless distancing media, Near Field Communications, short range communications such as Bluetooth, and scanning of QR codes, to screen or select group participants. In some cases security network information may be encoded in a Near Field Communication chip or a QR code to further facilitate automatic network establishment. The two devices that have been paired previously may save each other's credentials so that they can automatically recognize each other without having to go through the setup procedure again.

Once a group of participants has been selected, then the network and security information may be collected as indicated in block 16. Finally the ad hoc wireless network may be established as indicated in block 18 among the selected participants. No wireless infrastructure support may be required in some embodiments and such a network can be set-up and torn down on the fly. Further, in embodiments in which there is no master node in the network, even when the device that initiated the network leaves the scene, the network may remain functional.

Once the network is set up, mobile devices on the same network automatically and securely exchange user information such as user name, user avatar, or user image such that each participant can keep a database of the users within this ad hoc network. Mobile devices can also exchange time clock information and calculate the time offset with respect to each other. This timing offset based synchronization mechanism can help post image processing based on time stamps embedded within captured media.

Once the database of the users on the ad hoc network is established on each device within the network, a facial recognition algorithm can be used to analyze pictures captured by any device within the network. The facial recognition algorithm may use the captured image compared to the avatars or other user images associated with the users that were exchanged in the network set-up phase.

Figure 2:
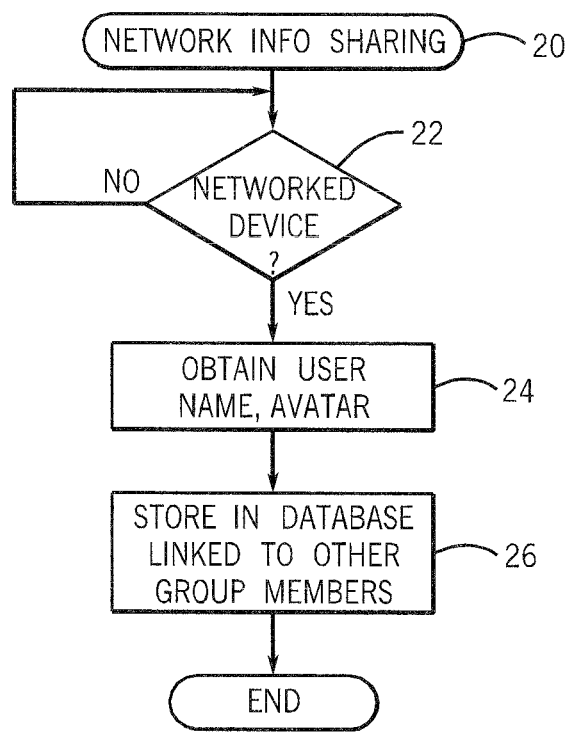
FIG. 2 is a network information sharing sequence in accordance with another embodiment.

Thus referring to FIG. 2, a network information sharing algorithm 20 may begin by determining whether there is a new network device as indicated at block 22. If so, the user name and avatar may be obtained and stored as indicated in block 24. Particularly, the information may be stored in a database linked to other group members as indicated in block 26.

Figure 3:
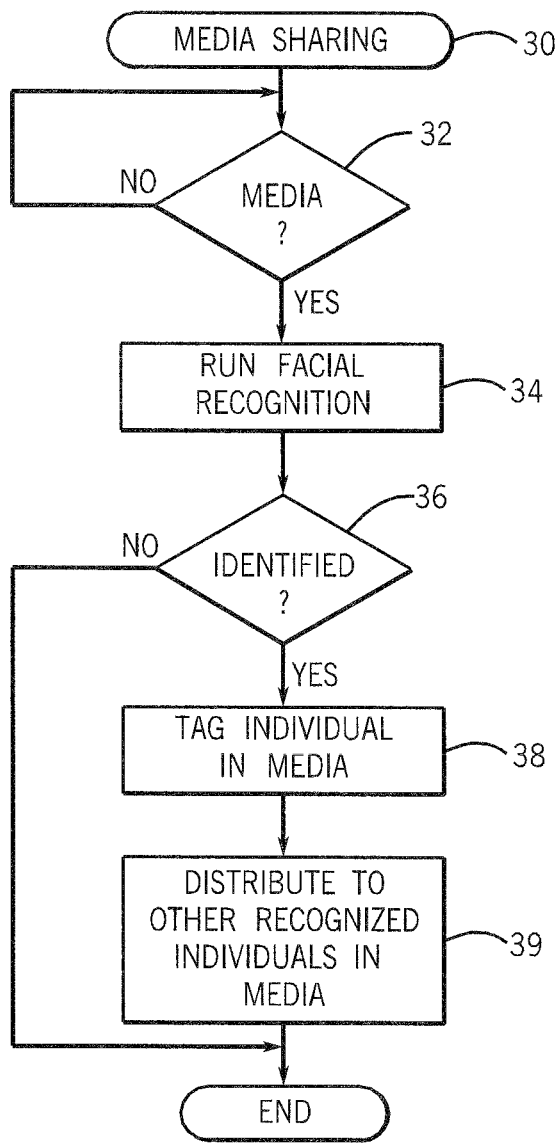
FIG. 3 is a sequence for media sharing in accordance with still another embodiment.
Figure 4:
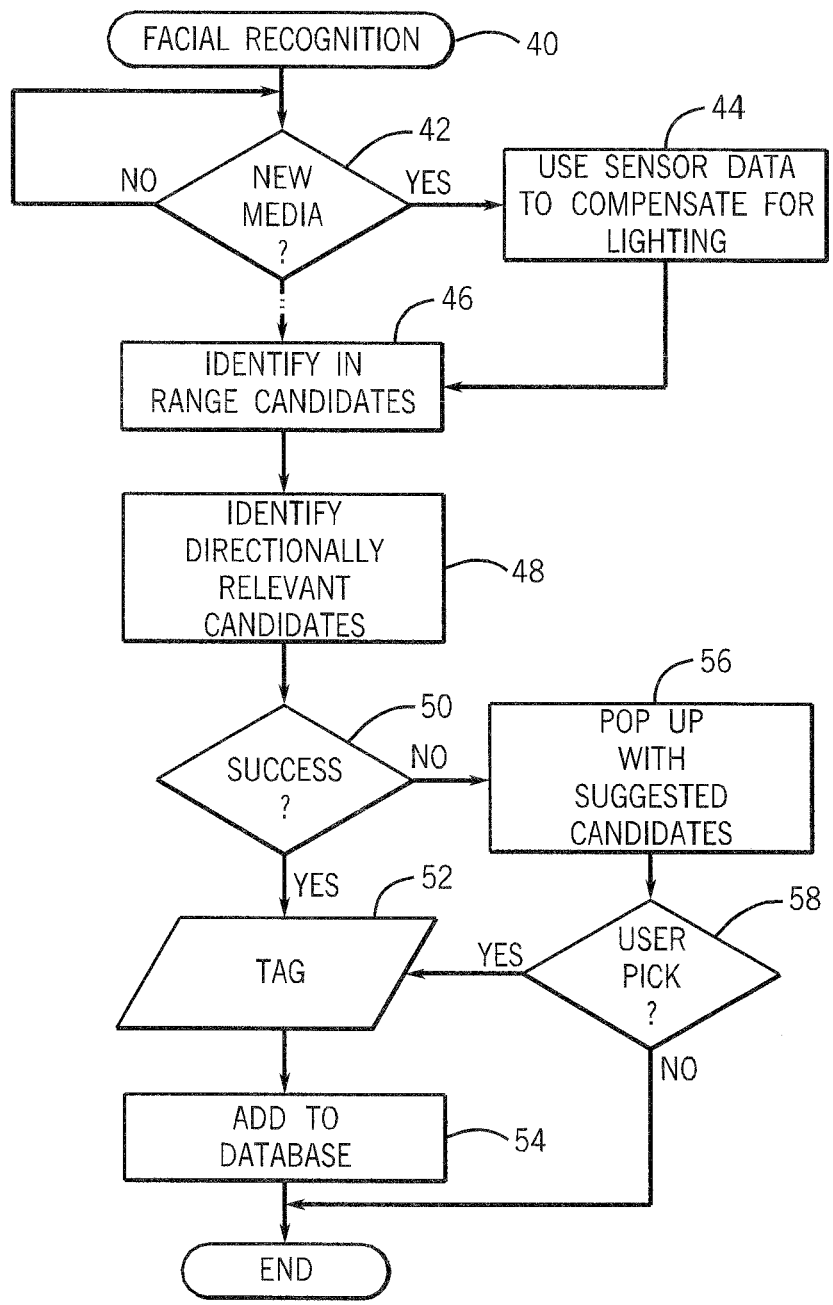
FIG. 4 is a sequence for facial recognition in accordance with yet another embodiment.

Turning next to FIG. 3, a media sharing algorithm 30 may be used to share media among the different networked devices. Initially, a check at diamond 32 determines whether there is new media such as a new digital photograph, movie, audio recording, clip or electronic file. If so, facial recognition may be run as indicated in block 34. In some embodiments the media may include an image with a number of depicted persons. A check at diamond 36 determines whether the individuals within the picture have been identified. If so, each identified individual depicted in the media may be tagged with a name as indicated in block 38. Each name may be associated with an address. Then the tagged media may be automatically distributed to the recognized individuals in the media or within the group. One way of distributing the media is via email using the addresses associated with the names or wirelessly. But any other media sharing technology may also be used. One way of using the facial recognition is to compare the image to the avatars that were previously stored for group members when the group was established.

A sequence 40 for implementing facial recognition in an efficient manner may be used in some embodiments. The sequence 40 may begin by determining whether new media has been received as indicated in block 42. Light sensor readings may be saved along with all captured and stored images including user avatars. In some embodiments, if new media is received, light sensor reading data may be saved along with the captured media and used to compensate for under or over lighting effects of the saved user avatar or the media in the database as indicated in block 44. For example the light sensor reading provided by the camera may be compared against other avatars and other stored media in the database that may be useful in compensating for lighting differences between the captured media and stored media to facilitate facial recognition. If directional sensors are used, the reading of the directional sensors can help to determine the shadow on the captured media, thus improving the accuracy of the face or recognition algorithm.

Lighting conditions will be different for different captured media. For example, if the picture is underexposed, the light sensor information may be used to determine whether a picture is underexposed or overexposed because people's skin colors are different, which results in different pixel readings even when the lighting conditions are the same. The use of a light sensor helps the facial recognition algorithm to determine how much compensation to apply to each image to bring all pictures to be compared to roughly the same lighting condition. Rather than correcting the picture (which in some embodiments may not be possible), information about exposure conditions can be recorded with the picture and then used to improve the comparison between the picture and stored pictures for facial recognition purposes or for other recognition purposes including gesture recognition purposes.

Specifically, if the picture is overexposed, then it is known that every pixel may be overexposed and therefore the comparison to a prior stored image may consider that all the pixels need to be treated as though they were slightly darker. Thus for purposes of comparison an offset may be subtracted from pixel intensity values of the overexposed picture to correct for the overexposure. Likewise an offset may be added to underexposed pictures. The value of the offset may be derived from a look up table in one embodiment that correlates sensor readings to offsets.

Because the lighting conditions may not be uniform, for instance, because the sun may come from a certain direction, shadows often appear on people's faces, making facial recognition more difficult. Directional sensor readings may be used to identify the direction of the lighting, thereby helping to identify the shadows on people's faces or different lightings on different parts of a face.

This may improve the ability of the image analysis technology to find a match when a match in fact exists. It may be useful in any case where a current picture is compared to a stored picture. The stored picture may have data that allows compensation and the current picture may have data that allows compensation. The data can include exposure information obtained from a light sensor and recorded with the picture. In other embodiments the sensor data may not be used.

In either case however the in-range candidates may be identified as indicated in block 46. The in-range candidates may be identified by determining what are their physical locations, for example using global position system coordinates received from them, triangulation techniques, or by culling users/mobile devices that are outside the range of short range wireless communication protocols such as Bluetooth or WiFi. Thus individuals within the group may be culled down based on whether or not they are sufficiently close to the candidates to make it likely that they were in fact within the picture that was just received.

In addition in some embodiments, directionally relevant candidates may be identified as indicated in block 48. This may be done using WiFi directional antennas and/or camera mounted orientation sensors combined with global positioning system readings. Many chipsets can support directional antennas. Based on the camera's field of view, a directional antenna or an antenna array can tilt its beam towards the desired direction of the camera's field of view to figure out which devices are within the camera's directional range or more particularly roughly within the camera's field of view.

The directional antenna or antenna array may be on the same side of the camera/image device. The directional antenna or the antenna array can cover a region that is similar to or slightly bigger than the camera's field of view in some embodiments. In addition many mobile devices are equipped with orientation sensors which can also be used to determine camera aim directions.

A check at diamond 50 determines whether the facial recognition was successful. If so, the image may be tagged which means to place a visual label on the picture indicating the user's name or avatar as indicated in block 52. Then the user's image may be added to the database for use in subsequent facial recognition operations.

If the facial recognition is not successful, then a pop-up of the image may be provided with a list of suggested candidate names that were derived from the listing of candidates that were in range (and directionally relevant as determined in blocks 46 and 48) as indicated in block 56. Then at diamond 58 the system waits for a user selection of the correct name. If a selection is received, then the image may be tagged with the user's selected avatar or name as indicated in block 52. Otherwise the flow ends.

In addition to automatic picture tagging and sharing, contextural information may be obtained from the mobile platform and from the Internet to automatically narrate media captured by people within the ad hoc network. Contextural information, such as location, time of day, season of year, speed, altitude change, lighting conditions, can easily be obtained either directly through simple calculations from sensors on the platform or from the Internet. Based on the onboard contextual information, other context information such as weather, temperature, site historic significance, can be obtained from the Internet. Pictures taken at different locations but belonging to the same event or pictures taken by different users within the same ad hoc network may be automatically compiled and narrated based on timing location and contextural information.

For example a series of group pictures may be automatically narrated according to the following example. A map of a hiking trail can be obtained from website information automatically based on locations of users. Pictures captured along the hiking trail may be placed on a map based on location information accompanying the pictures. For example based on onboard and context information a story line may be automatically compiled such as "Saturday, Feb. 11, 2012, sunny, mild. East wind, temperature 50° F., Jim, Frank, Nancy, and Tom went to Yosemite National Park and hiked along Old Big Oak Trail. Starting from Hodgdon Meadow at an elevation of 4900 feet at around 9:35 a.m. and continued until 4:50 p.m.

For each picture, the narrative may be generated automatically based on the relative location of the devices, facial recognition of users as well as other information. Thus for example the story may be automatically generated as follows: "Jim and Nancy are in the picture, looking very happy, while the picture is taken by Frank. Tom is 20 feet away." Users may also chose to include other information such as news of the day or items of historic significance related to the sites that are visited.

In some cases, sentence templates may be provided in which criteria for choosing the subject for the sentence and the right objects of the sentence are predefined. For example, the subjects may be the picture taker or the person whose picture is taken. The system can identify these individuals, locate their names and simply plug in the information in the template. In other cases, natural language development systems may be used such as those used in connection with interbots and other similar robot speech generation technologies.

Figure 5:
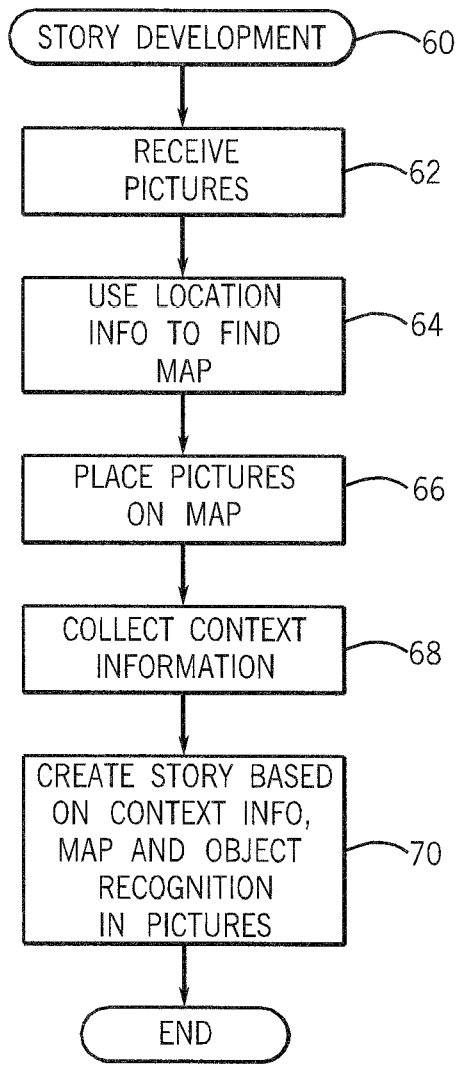
FIG. 5 is a sequence for automatic story development in accordance with one embodiment.

Thus referring to FIG. 5, a story development sequence 60 may begin by receiving pictures as indicated in block 62. Location information associated with those pictures may be used to find a map of the area, on the Internet for example, as indicated in block 64. Then the pictures may be placed on the map based on location information associated with the pictures as indicated in block 66. Next context information may be collected such as information about the location, its historical significance, its elevation, the current weather, current conditions all as indicated in block 68. Finally a story may be developed based on the context information, map and recognition of objects in the pictures such as the participant's names and their facial features such as smiling, sad or happy as indicated in block 70.

In some embodiments, the sequences shown in FIGS. 1-5 may be implemented in software, firmware and/or hardware. In software and firmware embodiments the sequences may be implemented by computer executed instructions stored in one or more non-transitory computer readable media. Examples of computer readable media include semiconductor, magnetic or optical storage devices.

Figure 6:
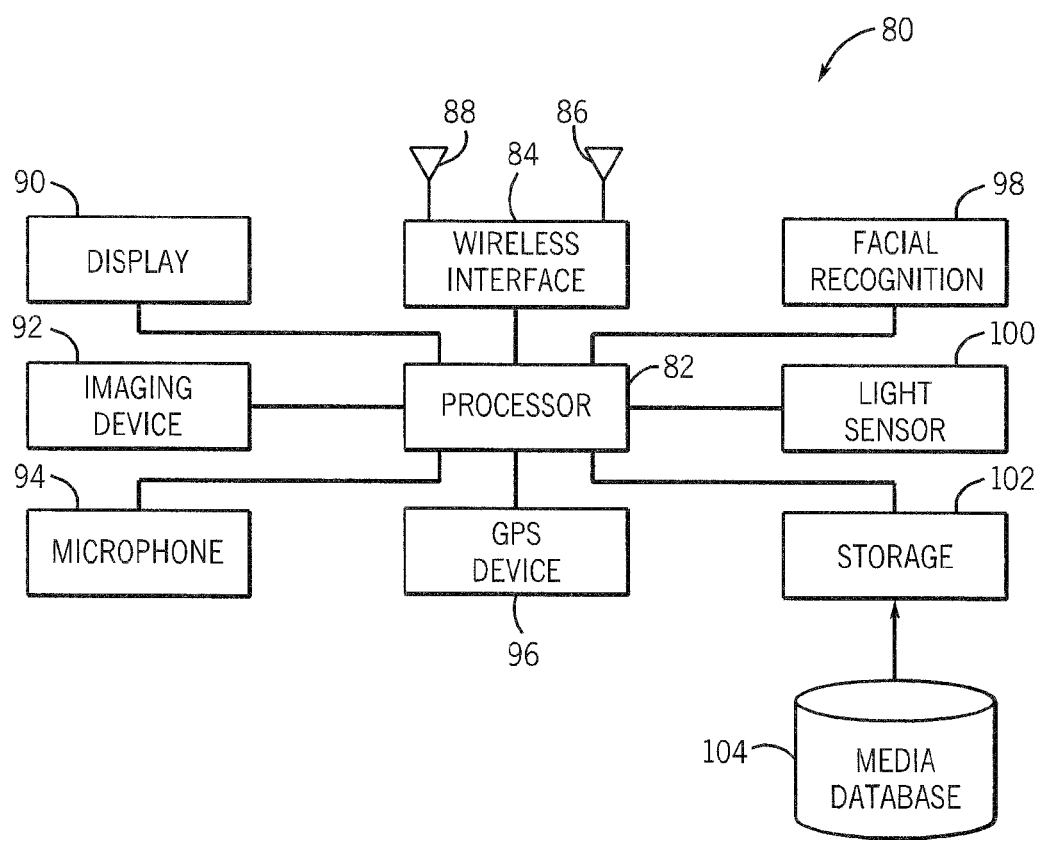
FIG. 6 is a schematic depiction for one embodiment.

Referring to FIG. 6, a mobile device 80 useful in connection with embodiments of the present invention may include a processor 82. The mobile device may be a cellular telephone, imaging device, a mobile Internet device, a tablet or laptop computer as examples. The processor 82 may communicate with a wireless interface 84 which may include antennas such as the antennas 86 and 88. In some embodiments, the antennas 86 and 88 may be directional or beam forming antennas. The processor 82 may also be coupled to a display 90, imaging device 92 and a microphone 94. A global positioning system device 96 may be coupled to the processor together with a storage 102.

In some embodiments a storage 102 may include a media database 104 that contains information useful in facial recognition and also includes information about various ad hoc networks and the numbers thereof. In addition a light sensor 100 may be used in order to improve images for facial recognition purposes. A facial recognition module 98 implemented in hardware or software may be coupled to the processor 82 in some embodiments.

The following clauses and/or examples pertain to further embodiments:

One example embodiment may be method using facial recognition technology to identify an individual depicted in a digital picture and automatically sending the picture to the identified individual. The method may include using light sensor information to compare said picture to a stored picture for facial recognition. The method may include using the distance of the individual from an imaging device to reduce a number of stored pictures that are analyzed for facial recognition. The method may include using the direction to the individual from the imaging device to reduce a number of stored pictures that are analyzed for facial recognition. The method may include automatically composing a textural story using information about the identity of an individual depicted in said picture. The method may include using sentence templates with instructions for how to fill in at least one of the subject or object of the sentence. The method may include developing a clickable list of candidate individuals who may be depicted in the picture, and when an entry is clicked on, tagging the picture with the selected identity. The method may include establishing an ad hoc network of wireless devices. The method may include establishing identities of ad hoc network users including obtaining avatars for the users. The method may include using the identities of users in the group to define a search field for facial recognition.

In another example embodiment one or more computer readable media may store instructions to enable a computer to perform a method including using facial recognition technology to identify an individual depicted in a digital picture, associating the individual with an address, and automatically sending the picture to the identified individual. The media may further store instructions to perform the method including using light sensor information to compare said picture to a stored picture for facial recognition. The media may further store instructions to perform the method including using the distance of the subject from an imaging device to reduce a number of stored pictures that are analyzed for facial recognition. The media may further store instructions to perform the method including using the direction to the subject from the imaging device to reduce a number of stored pictures that are analyzed for facial recognition. The media may further store instructions to perform a method including automatically composing a textural story using information about the identity of a person depicted in said picture. The media may further store instructions to perform the method including using sentence templates with instructions for how to fill in at least one of the subject or object of the sentence. The media may further store instructions to perform the method including developing a clickable list of candidate individuals who may be depicted in the picture, and when an entry is clicked on, tagging the picture with the selected identity. The media may further store instructions to perform a method including establishing an ad hoc network of wireless devices. The media may further store instructions to perform the method including establishing identities of users of an ad hoc network including obtaining avatars for the users. The media may further store instructions to perform the method including the identities of users in the group to define a search field for facial recognition Another example embodiment may be an apparatus comprising a processor to perform facial recognition and a light sensor coupled to said processor to compare information about the lighting when two different pictures were taken to facilitate comparison of the pictures for facial recognition purposes. The apparatus may include a directional light sensor to compensate for lighting effects when comparing two pictures. The apparatus may include a processor to use the distance of a subject from an imaging device to reduce a number of stored pictures analyzed for facial recognition purposes. The apparatus may include a processor to use the direction to the subject from the imaging device to reduce the number of stored pictures analyzed for facial recognition. The apparatus may also include said apparatus to perform facial recognition by comparing a picture of a person to an avatar associated with said person.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

using facial recognition technology to identify an individual depicted in a digital picture by obtaining information from a light sensor about the lighting when two pictures were taken and also obtaining color information for pixels in the two pictures from an image sensor, said image sensor and light sensor being different devices, and comparing information from said light sensor when two pictures were taken for facial recognition purposes to determine whether different pixel readings in the two different pictures are due to different exposure conditions;

compensating for the different exposure conditions; and then comparing the compensated pictures.

2. The method of claim 1 including using light sensor information to compare said picture to a stored picture for facial recognition.

3. The method of claim 1 including using a distance of the individual from an imaging device to facilitate the identification of the individual.

4. The method of claim 3 including using a direction to the individual from the imaging device to facilitate the identification of the individual.

5. The method of claim 1 including automatically composing a textural story using information about the identity of an individual depicted in said picture.

6. The method of claim 5 including using sentence templates with instructions for how to fill in at least one of a subject or object of a sentence.

7. The method of claim 1 including developing a clickable list of candidate individuals who may be depicted in the picture, and when an entry is clicked on, tagging the picture with the selected identity.

8. The method of claim 1 further including establishing an ad hoc network of wireless devices.

9. The method of claim 8 including establishing identities of ad hoc network users including obtaining avatars for the users.

10. The method of claim 9 including using the identities of users in the group to define a search field for facial recognition.

11. One or more non-transitory computer readable media storing instructions to enable a computer to perform a method including:

using facial recognition technology to identify an individual depicted in a digital picture by obtaining information from a light sensor about the lighting when two pictures were taken and also obtaining color information for pixels in the two pictures from an image sensor, said image sensor and light sensor being different devices, and comparing information from said light sensor when two pictures were taken for facial recognition purposes to determine whether different pixel readings in the two different pictures are due to different exposure conditions;

compensating for the different exposure conditions; and then comparing the compensated pictures.

12. The non-transitory computer readable media of claim 11 further storing instructions to perform the method including using light sensor information to compare said picture to a stored picture for facial recognition.

13. The non-transitory computer readable media of claim 11 further storing instructions to perform the method including using a distance of the subject from an imaging device to facilitate the identification of the individual.

14. The non-transitory computer readable media of claim 13 further storing instructions to perform the method including using a direction to the subject from the imaging device to facilitate the identification of the individual.

15. The non-transitory computer readable media of claim 11 further storing instructions to perform a method including automatically composing a textural story using information about the identity of a person depicted in said picture.

16. The non-transitory computer readable media of claim 15 further storing instructions to perform the method including using sentence templates with instructions for how to fill in at least one of a subject or object of a sentence.

17. The non-transitory computer readable media of claim 11 further storing instructions to perform the method including developing a clickable list of candidate individuals who may be depicted in the picture, and when an entry is clicked on, tagging the picture with the selected identity.

18. The non-transitory computer readable media of claim 11 further storing instructions to perform a method including establishing an ad hoc network of wireless devices.

19. The non-transitory computer readable media of claim 18 further storing instructions to perform the method including establishing identities of users of an ad hoc network including obtaining avatars for the users.

20. The non-transitory computer readable media of claim 19 further storing instructions to perform the method including the identities of users in the group to define a search field for facial recognition.

21. An apparatus comprising:

an image sensor;

a light sensor different from said image sensor; and a processor coupled to said light sensor and said image sensor to perform facial recognition by obtaining information from said sensor about the lighting when two different pictures were taken and also obtaining color information for pixels in the two pictures and comparing information from said light sensor when two pictures were taken, determining whether different pixel readings in the two different pictures are due to different exposure conditions, compensating for the different exposure conditions and then comparing the compensated pictures for facial recognition purposes.

22. The apparatus of claim 21 including a directional light sensor to compensate for lighting effects when comparing two pictures.

23. The apparatus of claim 21 including a processor to use a distance of a subject from an imaging device to facilitate the identification of the individual.

24. The apparatus of claim 23 including a processor to use a direction to the subject from the imaging device to facilitate the identification of the individual.

25. The apparatus of claim 21 said apparatus to perform facial recognition by comparing a picture of a person to an avatar associated with said person.

* * * * *